United States Patent [19]
Shaffer

[11] Patent Number: 5,653,204
[45] Date of Patent: Aug. 5, 1997

[54] PISTON ASSEMBLY RETAINING DEVICE

[75] Inventor: Bradley J. Shaffer, West Lafayette, Ind.

[73] Assignee: Caterpillar Inc., Peoria, Ill.

[21] Appl. No.: 651,131

[22] Filed: May 21, 1996

[51] Int. Cl.[6] ............................................. F01P 1/04
[52] U.S. Cl. .................. 123/193.6; 92/220; 92/238
[58] Field of Search ...................... 123/193.6; 92/187, 92/190, 220, 238; 29/888.07

[56] References Cited

U.S. PATENT DOCUMENTS

| | | |
|---|---|---|
| 1,088,510 | 2/1914 | Adams . |
| 1,491,155 | 4/1924 | McKone . |
| 1,513,946 | 11/1924 | Vincent . |
| 1,795,353 | 3/1931 | Taylor et al. . |
| 2,194,247 | 3/1940 | Russel . |
| 2,234,124 | 3/1941 | Jones . |
| 2,315,403 | 3/1943 | Dillon . |
| 2,618,522 | 11/1952 | Bowser . |
| 2,964,364 | 12/1960 | Morgan . |
| 3,971,355 | 7/1976 | Kottmann . |
| 4,005,686 | 2/1977 | Wizemann et al. ............... 92/190 |
| 4,011,797 | 3/1977 | Cornet . |
| 4,056,044 | 11/1977 | Kamman et al. . |
| 4,358,881 | 11/1982 | Mahrus et al. . |
| 4,577,595 | 3/1986 | Deutschmann et al. ............ 123/193.6 |
| 4,662,319 | 5/1987 | Ayoul . |
| 4,690,038 | 9/1987 | Klie et al. ............................. 92/238 |
| 4,928,578 | 5/1990 | Rhodes ................................. 123/193.6 |
| 4,964,332 | 10/1990 | Sawyer . |
| 5,054,454 | 10/1991 | Hamburg . |
| 5,144,884 | 9/1992 | Kelly . |
| 5,289,758 | 3/1994 | Berlinger . |

FOREIGN PATENT DOCUMENTS

| | | |
|---|---|---|
| 3148981C1 | 7/1983 | Germany . |
| 3641783A1 | 6/1987 | Germany . |

*Primary Examiner*—Marguerite McMahon
*Attorney, Agent, or Firm*—Robert J. Hampsch

[57] ABSTRACT

The design and construction of past piston pin assemblies includes a retaining device which adds stress concentration factors to the piston pin assembly, piston skirt or piston crown. The present invention provides a device for retaining the piston assembly to the connecting rod and retaining the two parts of the piston pin assembly together without adding a stress concentration factor. The device uses a retaining means which applies a compressive force along the entire piston pin to add rigidity to the piston pin assembly. This design additionally allows for a stronger piston assembly with greater pull apart resistance and/or a lighter total weight piston assembly.

9 Claims, 2 Drawing Sheets

PISTON ASSEMBLY RETAINING DEVICE

TECHNICAL FIELD

The present invention relates generally to a piston assembly for use in an internal combustion engine, compressor, or the like, and more particularly to a multi-part piston assembly including pivotally connected crown and skirt sections adapted for use in an internal combustion engine.

BACKGROUND ART

The last several years have seen an increasing emphasis being placed on the design of internal combustion engines to make them more compact, lighter, and yet with improved fuel economy, efficiency, and increased power output per cylinder. As the demands on modern engines increase, the piston assembly is subject to higher combustion chamber pressures and temperatures.

Several attempts have been made to overcome the effects of these higher combustion chamber pressures by altering the design of the piston member and its associated components, such as the piston pin and the retaining device, relative to the piston member. An example is disclosed in UK Patent Application No. GB 2225087 issued May 23, 1990 to applicant Metal Levy S A Industria Comerclo. The publication discloses an articulated piston assembly comprised of a head having two pin bosses integral with it, a skirt portion, and a wrist pin mounted in the pin boss holes in the skirt portion. The assembly further includes a restraining member to prevent lateral deformation of the pin bosses towards the cylinder liner thereby imparting a higher strength to the piston assembly. The lower ends of the pin bosses are split and are clamped to the pin by means of nuts and bolts.

Another example is disclosed in UK Patent Application No. 0222359 published May 20, 1987 to applicant AE PLC. The publication discloses an articulated piston assembly comprised of a crown portion having pin bosses and a skirt portion. The two portions have a common pin bore axis characterized in that the skirt portion is connected to the crown portion by a pair of stud pins fixedly positioned in the crown portion to prevent axial movement of the pin. In the preferred embodiment, the skirt portion comprises a plastic material. The stud pins may also comprise a plastic material to reduce the reciprocating mass of the piston assembly. The stud pins are retained by rubbing in constant or intermittent contact with the associated cylinder or cylinder liner wall.

Another example of a piston assembly is disclosed in U.S. Pat. No. 5,144,844 issued Sep. 8, 1992 to E. L. Kelly. The patent discloses a piston assembly including a piston rod with a pin receiving opening at its upper end, a piston head having a transverse bore, and a piston pin. The piston pin is disposed through the pin receiving opening of the piston rod and the transverse bore of the piston head to connect the piston head to the piston rod. The piston assembly also includes a piston skirt which is connected to the piston head. The piston pin includes an axial bore and the piston skirt has a transverse bore. At least one piston skirt pin is disposed through the piston pin axial bore and the transverse bore of the piston skirt to connect the piston skirt to the piston pin. This connects the piston skirt to the piston head. A fastening device secures the piston skirt pin in position within the piston skirt and the piston pin. In one embodiment, the piston skirt pin extends completely through the piston pin axial bore and the fastening device includes a pair of snap rings. In another embodiment, two piston skirt pins are used. Each piston skirt pin is disposed in a respective end of the piston axial bore. The fastening device includes complimentary threads formed on one end of each piston skirt pin and in the piston pin axial bore. Alternatively, the fastening device includes forming the piston skirt pin with a slightly larger diameter than the piston pin axial bore. Each piston skirt pin is then press fit into the piston pin axial bore.

Another example of a piston assembly is disclosed in U.S. Pat. No. 5,289,758 issued Mar. 1, 1994 to W. G. Berlinger. The patent discloses a piston assembly comprised of a cylindrical main body having a pair of radially inset leg members extending from the main body which are spaced apart from one another. Each of the leg members has a bore position therein. A cylindrical wrist pin is positioned within the bores. The piston assembly is further comprised of a pair of wrist pin plugs, one of each being positioned at least partially within the inner surface at each end of the wrist pin. The wrist pin plugs include a head portion having a preestablished diameter being less than the preestablished diameter of the wrist pin outer surface. The wrist pin plugs further include a shank portion extending from the head portion. The shank portion of the plug has a diameter which provides for an interference fit between the shank and the wrist pin. As the plugs are forced into the wrist pin, the interference fit between the inner surface of the wrist pin and the outer surface of the plug causes a resistive force to be applied to the inner surface of the wrist pin and retain the plugs within the wrist pin. During operation of the piston assembly, the shank portion retains the wrist pin in proper alignment in the piston assembly. The wrist pin and the attached plugs are free to move axially within the radially inset leg members.

In each of the prior art piston assemblies the fastening device secures the piston skirt to the piston head by using threads, a interference fit or snap ring grooves. Each of these types of embodiments causes a stress concentration factor that results in a weaker piston pin. The present invention is directed to overcome one or more of the problems as set forth above.

DISCLOSURE OF THE INVENTION

In one aspect of the invention, a piston assembly for use in a reciprocating engine having a crankshaft and a connecting rod for connecting the piston assembly to the crankshaft is disclosed. The connecting rod includes a bore for connecting the connecting rod to the piston assembly. The piston assembly comprises a generally cylindrical piston crown having a pair of radially inset support struts extending therefrom. The support struts are spaced one from the other a preselected distance. Each of the struts includes a transverse bore positioned to align with the connecting rod bore. The piston assembly further includes a hollow cylindrical piston skirt having an outer diameter and an inner diameter thereby forming a wall of a preselected thickness. The piston skirt includes a pair of radial bores of a preselected diameter. The piston assembly also includes a generally cylindrical piston pin disposed through each of the piston support strut transverse bores and the connecting rod bore to connect the piston crown to the connecting rod. The piston pin has a length generally equivalent to the piston skirt inner diameter. It has an outer surface diameter which is greater than the piston skirt bore diameter. In addition, the piston pin includes an axial bore. A pair of spindles, each having a first portion disposed within the piston skirt radial bores, are included in the piston assembly. The spindle first portion has a length generally equivalent to the thickness of the piston skirt wall. Each spindle also includes a reduced diameter portion blendingly extending axially from the first portion forming a shoulder therebetween. The reduced diameter portion is disposed within the piston pin axial bore and has a length suitable for retaining the reduced diameter portion within the piston pin axial bore. Finally, a retaining means is included to retain the piston skirt and the piston crown to the connecting rod and to apply a compressive force along the entire piston pin length whereby the piston pin rigidity is increased.

BEST MODE FOR CARRYING OUT THE INVENTION

Figure 1:
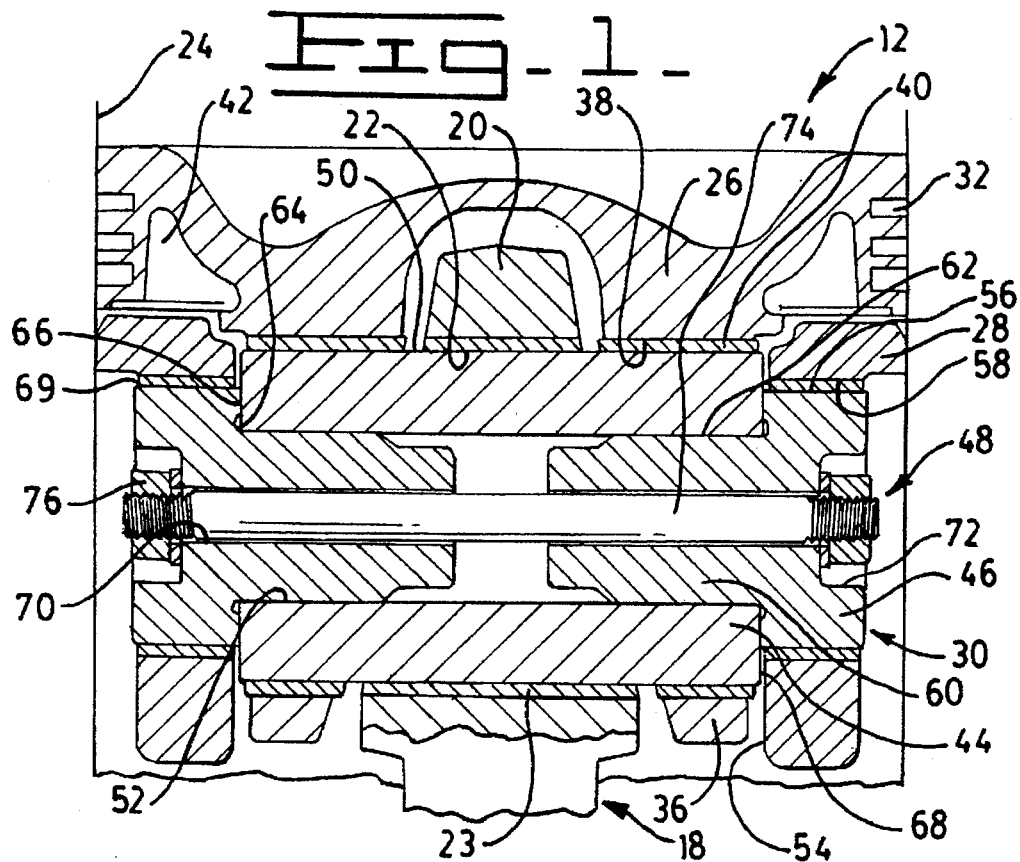
FIG. 1 is a side view partially in cross-section of the piston assembly according to one embodiment of the present invention.

Referring to FIG. 1, an internal combustion engine includes a piston assembly 12 and a cylinder. The engine further includes a crankshaft (not shown) rotatably positioned therein in a conventional manner. A connecting rod 18 is rotatably attached to the crankshaft at its lower end and includes a connecting rod bore 22 at its upper end for connecting said piston assembly 12 to said connecting rod 18. A connecting rod bearing 23 is press fit within the connecting rod bore 22 proximate the connecting rod paper end 20 to allow for rotation of the piston pin assembly 30 with respect to the connecting rod 18. The connecting rod bearing 23 is preferably a journal bearing made of copper and aluminum.

Piston assembly 12 is disposed within cylinder having cylinder wall 24. The piston assembly 12 includes a piston crown 26 defining an oil reservoir 42, piston skirt 28, and a piston pin assembly 30. The piston crown 26 is preferably formed of forged steel. The piston skirt 28 is preferably formed of a lighter weight material such as high strength aluminum or a composite. Piston crown 26 includes a plurality of annular grooves 32 formed around its upper portion to receive piston rings (not shown). Piston crown 26 also includes a pair of radially inset support struts 36. Each of the support struts 36 has a generally circular transverse bore 38 defined therein. The bores 38 within each of the support struts 36 and are all coaxially aligned one to the other. The pair of support struts 36 are spaced a preestablished distance from each other. The piston crown transverse bores 38 extends totally through every support strut 36 along an axis perpendicular to the central axis of the piston crown 26. Included within each of the support strut bores 38 are support strut bearings 40 to provide for rotation of the piston pin assembly 30 within the piston crown 26. The support strut bearing 40 is preferably a journal bearing made of copper and aluminum which is press fit into the piston crown bore 38.

Piston pin assembly 30 is disposed within piston crown transverse bores 38 and connecting rod bore 22 to connect the piston crown 26 to the connecting rod 18. The piston pin assembly 30 includes piston pin 44, a pair of spindles 46 and a retaining member 48. Piston pin 44 has an outer surface 50 and a piston pin axial bore 52 extending therethrough. The piston pin 44 has a length generally equivalent to the piston skirt inner surface 54. The piston pin axial bore 52 is of a diameter suitable for receiving spindle 46.

As shown in FIG. 1, spindle 46 has a first surface 56 disposed within the piston skirt axial bore 58. The spindle first surface 56 has a thickness generally equivalent to the wall thickness of the piston skirt 28. The spindles 46 each have a reduced diameter portion 60 extending perpendicular to the spindle first portion. The reduced diameter portion 60 has an outer surface 62 of a diameter suitable for insertion into the piston pin axial bore 52 without an interference fit. The intersection of the spindle first portion and the reduced diameter portion blendingly form a spindle shoulder 64 therebetween. The spindles 46 are retained within the piston pin axial bore by retaining means 48. The retaining means 48 retains the spindles 46 within the piston skirt 28 and thereby connects the piston crown portion 26 to the piston skirt 28. The retaining means 48 further loads the spindle shoulder 64 against the piston pin ends 66 and 68, respectively, and thereby applies a compressive force to the piston pin 44 along its entire length. In an alternative embodiment shown in FIG. 1, the piston skirt axial bore 58 could include a piston bearing 69 to provide for rotation between the spindle first surface 56 and the piston skirt 28.

In the embodiment of the present invention of FIG. 1, the spindles 46 each include an axial extending bore 70 and a countersunk bore 72. In this embodiment, the retaining means 48 includes a retaining rod 74 with threaded ends and two retaining nuts 76. The retaining rod 74 is disposed within the spindle axial bore 70 and the piston pin axial bore 52. The ends of the retaining rod extend beyond the piston pin 44 and through the spindles 46. Retaining nuts 76 are threaded onto the retaining rod 74 and disposed within the countersunk bore 72. The retaining means thereby clamps the spindle shoulder 64 against the piston pin ends 66,68 and applies a compressive force along the piston pin length.

Figure 2:
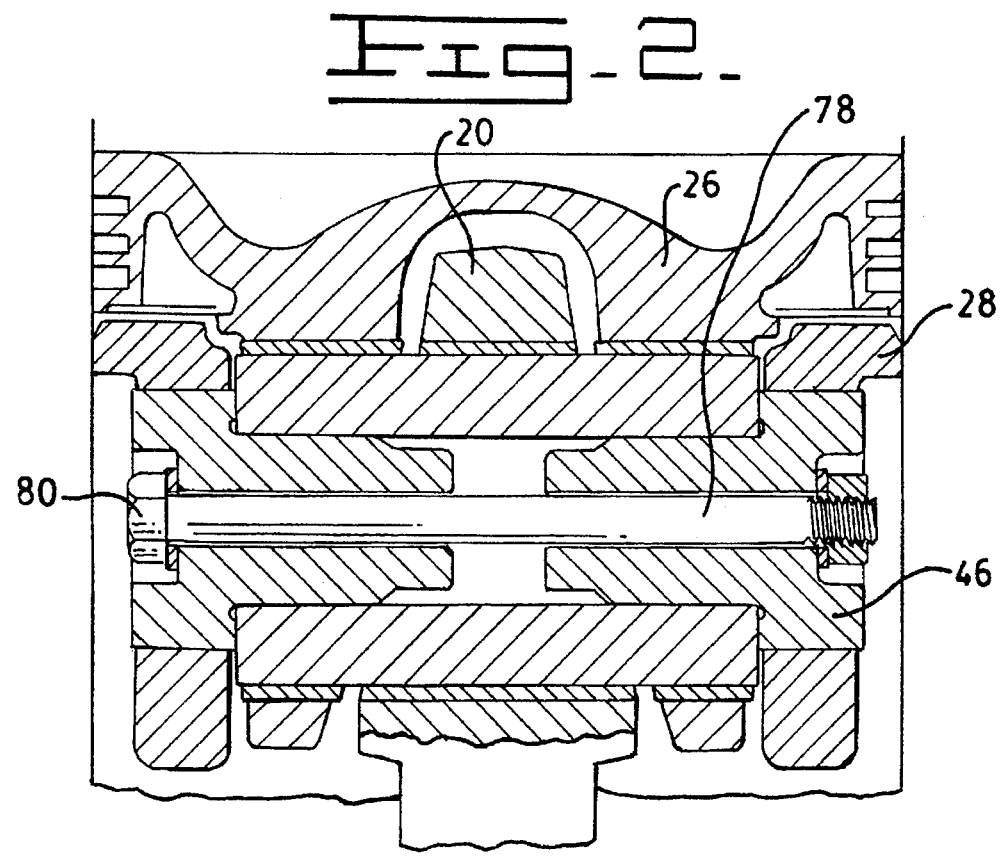
FIG. 2 is a side view partially in cross-section of the piston assembly according to another embodiment of the present invention.

Alternatively in a second embodiment, a retaining bolt 78 may be used in place of the retaining rod 74, FIG. 2. In this embodiment, the head of the bolt 80 is disposed within the countersunk bore 72 and the retaining nut 76 is threaded onto the bolt 78 and thereby applies a compressive force to the piston pin 44.

Figure 3:
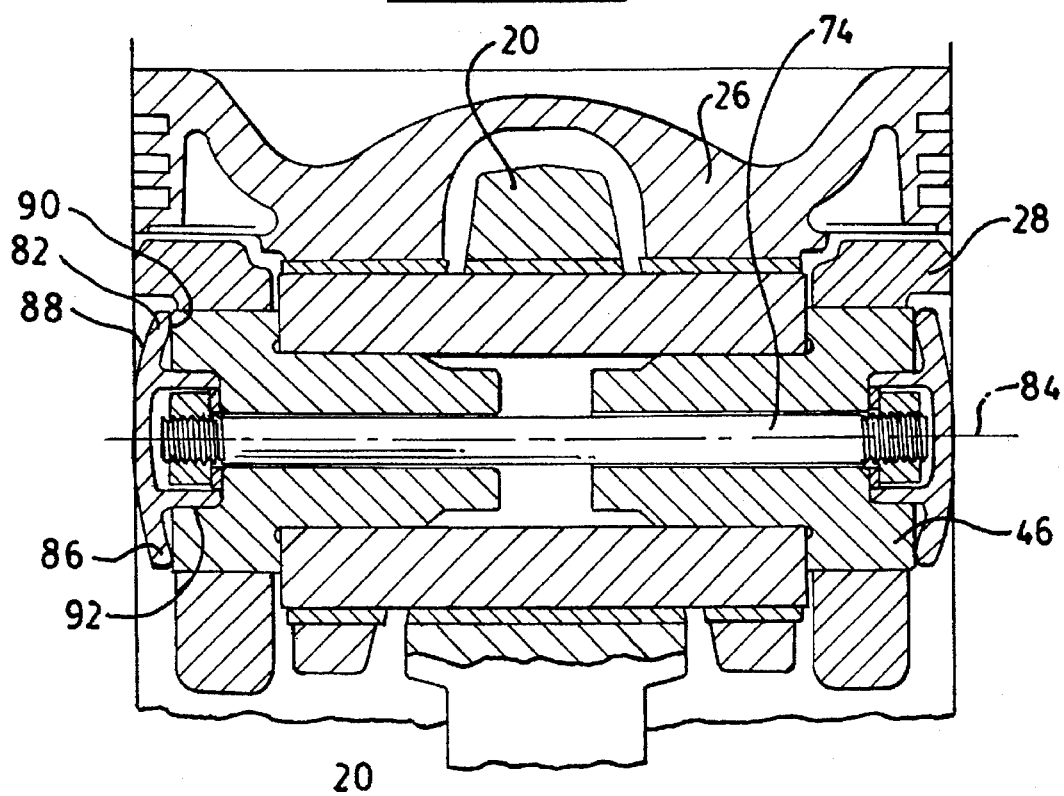
FIG. 3 is a side view partially in cross-section of the piston assembly according to another embodiment of the present invention.

In a third embodiment of the present invention shown in FIG. 3, the retaining means 48 includes a piston plug 82. Each of the plugs 82 has an axis 84 and a head portion 86 having a preestablished diameter greater than that of the preestablished diameter of the spindle countersunk bore 72. The head portion 86 has a generally convex spherical outer surface 88. The head portion 86 of each plug 82 has a preestablished length. The preestablished length is measured from the crest of spherical outer surface 88 to the inner contact surface 90. Each of the piston pin plugs 82 further includes a shank portion 92 blendingly extending from the concave spherical outer surface 88. The shank portion 92 has a generally cylindrical configuration having an outer surface suitable for insertion into the spindle countersunk bore 72. The piston pin plugs 82 protect the retaining means 48 and prevent the piston pin ends 66 and 68 from contacting the piston skirt inner surface 54.

In operation, the convex spherical outer surface 88 may come in contact with the surface of the cylinder. Experimentation has shown that such contact may result in transfer of material from the plug 82 to the cylinder. Experimentation has also shown that the transfer of this material does not influence the sealing or wear rate of the piston rings. The piston plugs 82 protect the retaining mean ends and also act to improve the lubrication of the piston skirt outer surface as it moves within the engine cylinder.

Figure 4:
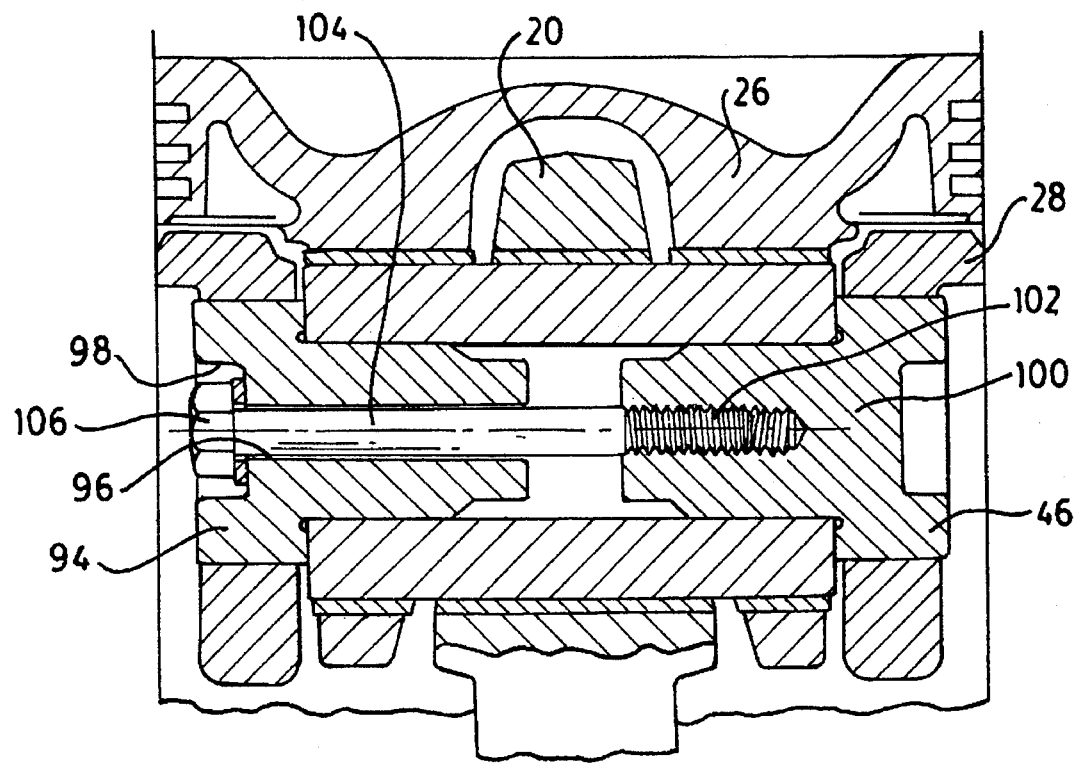
FIG. 4 is a side view partially in cross-section of the piston assembly according to another embodiment of the present invention.

In another embodiment of the present invention of FIG. 4, one spindle 94 includes an axial extending bore 96 and a countersunk bore 98. The second spindle 100 includes an axial threaded bore 102. In this embodiment, the retaining means 48 includes a retaining bolt 104 disposed within the spindle axial bore 96. The head of the bolt 106 is disposed within the countersunk bore 98 and the threaded portion engages the axial threaded bore 102. The retaining means thereby clamps the spindle shoulders against the piston pin ends 66,68 and applies a compressive force along the entire piston pin length.

INDUSTRIAL APPLICABILITY

The piston assembly of the present invention performs a reciprocating piston function while having reduced dimensions and reduced weight. The piston assembly finds applications with internal combustion engines. This design is particularly suitable for engines used with truck and automotive vehicles, as well as stationary power plants, where engine size and weight are critical considerations.

In this specific example, the piston assembly 12 is of the articulated design and is positioned in the cylinder bore of an engine. The piston assembly 12 is assembled prior to assembling in the engine. For example, in a subassembly operation, the piston pin 44 is inserted through the piston crown transverse bores 38 and the connecting rod bore 22. The piston crown 26 is then assembled into the piston skirt 28. Lastly, spindles 46 are inserted into the piston pin axial bore 52 and a means of retaining the assembly together such as those shown in the embodiments of FIGS. 1, 2, 3 and 4 is applied. As retaining nuts 76 are torqued, a compressive load is applied to the spindle 46 and this force acts through the spindle shoulder 64 to the piston pin 44.

During operation of the piston assembly 12 in the engine, the compressive preload force applied to the piston pin tends to make the piston pin 44 more rigid and better able to resist the high gas forces transferred through the piston crown 26 and the inset support struts 36. The present invention maintains a thick, strong cross-sectional piston pin to resist the high gas forces associated with today's high compression engines but allows the spindles 46 to be made with a smaller diameter to resist the smaller inertial shaking forces that the piston skirt 28 experiences. The smaller spindles 46 also allow the area of the piston skirt to be made larger and stronger by reducing the piston skirt axial bore 58.

Additionally, the present invention eliminates the need for threads, press fits or the use of snap rings or circle clips typically used to retain the piston pin in place. Elimination of these factors makes the present invention free of stress concentration factors and thereby improves the overall strength of the piston assembly 12. These stress concentration points may lead to pull apart of the piston. Pull apart refers to the damage associated with the crown portion of the piston being separated under high force from the skirt portion.

Use of the present invention also allows for piston assembly designs which draw the top surface of the piston crown down closer to the piston pin axis. The reduction in overall height of the piston assembly 12 allows for lower compression ratio piston designs and/or reduced piston weight.

Numerous characteristics, advantages and embodiments of the invention have been described in detail in the foregoing description with reference to the accompanying drawings. However, the disclosure is illustrative only and the invention is not limited to the precise illustrated embodiments. Various changes and modifications may be affected therein by one skilled in the art without departing from the scope or spirit of the present invention.

I claim:

1. A piston assembly for use in a reciprocating engine having a crankshaft and a connecting rod for connecting said piston assembly to said crankshaft, the connecting rod having a bore, the piston assembly comprising:

a generally cylindrical piston crown having a pair of radially inset support struts extending from the piston crown and being spaced one from the other a preselected distance, each of said struts including a transverse bore positioned to align with said connecting rod bore, a hollow cylindrical piston skirt having an outer diameter and an inner diameter thereby forming a wall of a preselected thickness, said piston skirt including a pair of radial bores;

a generally cylindrical piston pin disposed through each of said support strut transverse bores and said connecting rod bore to connect said piston crown to said connecting rod, said piston pin having a length generally equivalent to said piston skirt inner diameter and having an outer surface diameter which is greater than said piston skirt radial bore diameter, said piston pin including an axial bore;

a pair of spindles, each said spindle having a first portion disposed within said piston skirt radial bores, the first portion being of a length generally equivalent to the thickness of the piston skirt wall and said spindles having a reduced diameter portion blendingly extending axially from said first portion forming a shoulder therebetween, said reduced diameter portion disposed within said piston pin axial bore and having a length suitable for retaining the reduced diameter portion within said piston pin axial bore; and, a retaining means to retain said piston skirt to said piston crown and to apply a compressive force along the entire piston pin length whereby the piston pin rigidity is increased.

2. The piston assembly of claim 1 wherein each of said spindles further includes an extending axial bore and a countersunk bore, said retaining means being disposed within said spindle bores.

3. The piston assembly of claim 2 wherein said retaining means includes a stud having threads located on both ends of said stud and a pair of nuts to engage said threads and thereby apply a compressive force along said piston pin length.

4. The piston assembly of claim 2 wherein said retaining means includes a shoulder bolt having threads located at one end and a head located at the other, and a nut to engage said threads and thereby apply a compressive force along said piston pin length.

5. The piston assembly of claim 2 further including a spindle plug having a head portion of a preestablished diameter greater than said countersunk bore and said head portion further including a generally convex spherical outer surface and during operation of said piston assembly within an engine said outer surface may contact with a cylinder bore in which said piston assembly is positioned, said spindle plug further including a shank portion extending from said head portion, said shank portion having an outer diameter and a length suitable for being disposed in said spindle countersunk bore.

6. The piston assembly of claim 1 wherein said piston pin defines opposite ends and said spindle shoulder engages said piston ends to apply said compressive force.

7. The piston assembly of claim 1 wherein the compressive force is applied without providing stress concentrations to said piston pin.

8. The piston assembly of claim 1 further including a piston bearing disposed within the piston skirt radial bore and being interposed between the piston skirt and the spindle first surface.

9. The piston assembly of claim 1 wherein the retaining means includes a retaining bolt and a spindle including a axial threaded bore, said retaining bolt having threads located at one end and a head located at the other, said threads engaging said spindle axial threaded bore to apply a compressive force along said piston pin length.

* * * * *